(No Model.)

G. B. CORNELL.
Bung-Bush.

No. 228,731.                         Patented June 15, 1880.

Witnesses

Inventor
George B. Cornell
By Merriam & Whipple
Attorneys

UNITED STATES PATENT OFFICE.

GEORGE B. CORNELL, OF CHICAGO, ILLINOIS.

BUNG-BUSH.

SPECIFICATION forming part of Letters Patent No. 228,731, dated June 15, 1880.

Application filed April 12, 1880. (No model.)

*To all whom it may concern:*

Be it known that I, GEORGE B. CORNELL, a citizen of the United States, residing at Chicago, in the county of Cook and State of Illinois, have invented certain new and useful Improvements in Bung-Bushes and the application of the same to the bung-holes of barrels, casks, &c., of which the following is a specification.

The improvement is made upon the bung-bush described in my reissued Letters Patent, (Reissue No. 8,759,) being bushes designed to be screwed into the bung-hole and stopped by a wooden bung or plug; and the improvement consists in changing that feature or part of the bush which comes in contact with the stave, to adapt the bush to be so applied that its outer or larger end shall be even with the outside surface of the stave.

The improvement is designed to avoid two objections found, in practice, to the application of my said former bush, namely: first, its projection above the outer surface of the stave, which abrades floors in rolling the barrels over them and the other barrels when loaded together on a wagon in transportation; and, second, the operation of the flange against the outside of the stave when the bush is screwed too far, so that the pressure of the flange upon the stave is more than the female thread cut by the bush in the stave will bear. This is frequently done, and the female thread is thereby broken, so as to cause the bush to become loose and leak. The first of these objections can only be obviated by countersinking the flange, which is objectionable, because it requires extra labor and reduces the thickness of the stave around the bung-hole. The second objection cannot well be obviated without the present improvement.

Figure 1:
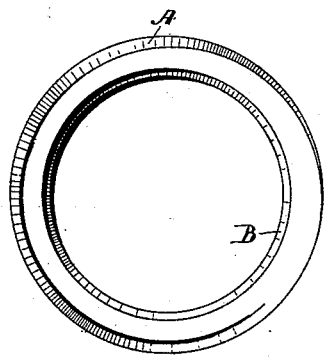
Figure 2:
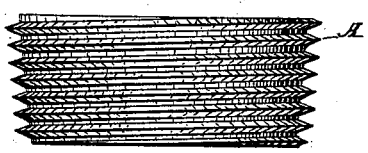
Figure 3:
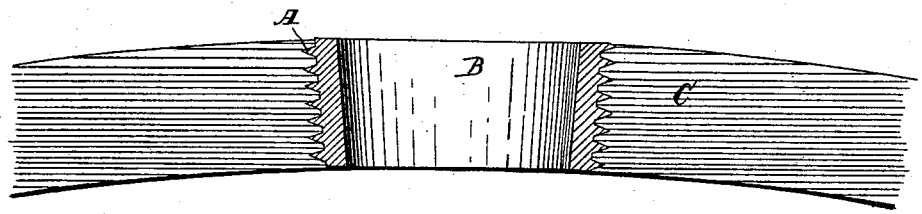

The improvement is illustrated in the accompanying drawings, in which Figure 1 is a top view of the improved bush. Fig. 2 is a side view of the same, and Fig. 3 a vertical central section of the bush in a stave.

A is the outer surface, upon which the improvement is made, and B is the inner surface, constructed as shown in my said former patent.

The line of the outer surface of the bush should correspond to that of the interior wall of the bung-hole—that is, it should be straight and even from end to end and screw-threaded from end to end of the bush, and without any flange or other projecting or un-screw-threaded part, in order that the bush may be screwed down into the bung-hole level with the outer surface of the stave, and at the same time make a perfectly-tight joint.

The outer surface is of the form of the frustum of a cone, and screw-threaded from bottom to top. Such bush is applied to the bung-hole by means of my improved wrench shown in Letters Patent to me dated February 10, 1874, No. 147,241, by which the bush is screwed down into the bung-hole, small end foremost, until the larger end of the bush is level with the outer surface of the stave.

I have applied this improved bush in the way stated, and found it to entirely remove the objections named and to work with perfect success.

I am aware that bung-bushes have heretofore been made without a flange, and having the outer surface tapering and screw-threaded all the way from top to bottom end; but such surface has always been used in combination with a screw-threaded interior, or an interior surface otherwise specially adapted to receive and hold a metallic bung of special construction; and also that bung-bushes designed to be used with a wooden bung have heretofore been made without a flange, and being tapered and screw-threaded on the outside nearly all the way from top to bottom end, having only a small portion at the top not screw-threaded, in combination with an interior surface smooth all except a small shallow screw-threaded portion at the bottom, designed to hold the inserter when screwing in the bush, and said to be of service in holding in the bung. With this the bush cannot be practically screwed down level with the face of the stave, and the bung swells when wet by the liquor in the cask and fills the thread at the bottom, so that the bung cannot practically be withdrawn. None of these devices, nor the same in combination, is my invention, which includes the outer screw-threaded surface from end to end of a frusto-conical-shaped bush, combined in such bush with a like shaped interior surface only when such interior surface is smooth and without screw-thread or other indentation or projection to break such surface along its whole length from top to bottom end of the bush, and not otherwise, whereby the bush is adapted to be screwed in and held level with the face of the stave, and there serve practically with a compressible bung, as required, in closing and opening the bung-hole.

Having thus described my invention, what I claim, and desire to secure by Letters Patent, is—

As an improvement in bung-bushes, a frusto-conical-shaped exterior surface without a flange, and screw-threaded from end to end of the bush, in combination with a like shaped interior surface only when such interior surface is smooth and unbroken from end to end of the bush by any screw-thread or indentation or projection of any kind thereon, substantially as and for the purpose specified.

GEORGE B. CORNELL.

Witnesses:
JNO. H. WHIPPLE,
J. W. MERRIAM.